(12) United States Patent
Ogata et al.

(10) Patent No.: US 6,785,230 B1
(45) Date of Patent: Aug. 31, 2004

(54) AUDIO TRANSMISSION APPARATUS

(75) Inventors: Keisuke Ogata, Fukuoka (JP); Yutaka Takeda, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/577,713

(22) Filed: May 23, 2000

(30) Foreign Application Priority Data

May 25, 1999 (JP) .......................................... 11-144490

(51) Int. Cl.[7] .............................................. H04Q 3/64
(52) U.S. Cl. ...................... 370/230; 370/516; 370/519
(58) Field of Search ................................. 370/230, 412, 370/415, 516, 517, 519

(56) References Cited

U.S. PATENT DOCUMENTS

| | | | | |
|---|---|---|---|---|
| 3,652,800 A | * | 3/1972 | Dooley ........................ | 370/363 |
| 4,706,260 A | * | 11/1987 | Fedele et al. ................ | 375/245 |
| 5,742,649 A | * | 4/1998 | Muntz et al. ................ | 375/371 |
| 5,790,538 A | * | 8/1998 | Sugar ........................ | 370/352 |
| 5,901,149 A | * | 5/1999 | Itakura et al. ............... | 370/468 |
| 6,064,706 A | * | 5/2000 | Driskill et al. .............. | 375/372 |
| 6,075,831 A | * | 6/2000 | Schnizlein et al. ......... | 375/359 |
| 6,088,413 A | * | 7/2000 | Autry et al. ................. | 375/372 |
| 6,301,258 B1 | * | 10/2001 | Katseff et al. .............. | 370/412 |
| 6,452,950 B1 | * | 9/2002 | Ohlsson et al. ............. | 370/516 |

FOREIGN PATENT DOCUMENTS

| | | |
|---|---|---|
| JP | 7-87124 | 3/1995 |
| JP | 9-251713 | 9/1997 |

\* cited by examiner

*Primary Examiner*—Huy D. Vu
*Assistant Examiner*—Daniel Ryman
(74) *Attorney, Agent, or Firm*—RatnerPrestia

(57) ABSTRACT

In an audio transmission apparatus used in an asynchronous communication network, a receiving buffer stores temporarily an audio packet received in a network interface section. This audio data is decoded in an audio decoder, and is passed through a D/A converting speed changer, and the digital audio data is converted into analog in a D/A converter. Concurrently, in a delay time fluctuation measuring section, the delay time fluctuation of audio packet received is measured in the network interface section, and a buffer controller determines the data storage amount of the receiving buffer on the basis of this delay time fluctuation. Accordingly, the buffer controller changes the D/A converting speed on the basis of the delay time fluctuation, thereby adjusting the audio data flow from the receiving buffer. Accordingly, a real-time audio transmission apparatus capable of avoiding lack of audio data in the buffer and reproducing audio continuously is presented.

2 Claims, 10 Drawing Sheets

AUDIO TRANSMISSION APPARATUS

TECHNICAL FIELD

The present invention relates to a real-time audio transmission apparatus for transmitting audio data in real time on a network of asynchronous communication such as Ethernet.

BACKGROUND OF THE INVENTION

Recently, in bus-format Local Area Network (LAN) or asynchronous communication such as Ethernet and Asynchronous Transfer Mode (ATM), improvement of quality is demanded in the real-time audio transmission apparatus for transmitting audio data in real time.

FIG. 10 is an explanatory diagram showing a first example of communication system using a conventional audio transmission apparatus, which shows an example of audio transmission by packet data using a communication network with a constant delay time.

The communication system in FIG. 10 comprises a transmission side audio transmission apparatus 1001a, a reception side audio transmission apparatus 1001b, a communication network 1011 with a constant delay time, and a receiving buffer 1003. Generally, in the case of the communication network 1011 with a constant delay time, the audio packet transmitted at a specific interval is also received at a specific interval at the reception side, so that a continuous audio reproduction is realized.

FIG. 11 is an explanatory diagram showing a second example of communication system using a conventional audio transmission apparatus. Referring now to this diagram, a communication system using a communication network involving delay time fluctuation is explained. A communication network 1111 is an asynchronous communication network such as Ethernet. In the case of the asynchronous communication network 1111, since an irregular change of delay time, that is, a delay time fluctuation occurs, if the delay is significant, the audio data of the receiving buffer 1103 is empty, the sound is lacking, and the audio quality deteriorates.

As a countermeasure of this problem, assuming a maximum delay time fluctuation of the communication network, the audio data for this time duration is stored in a receiving buffer 1103 in advance. Then, in the event of a delay time fluctuation, the audio data stored in the receiving buffer 1103 is reproduced, so that a continuous audio reproduction without pause is realized.

This countermeasure, however, needs to determin the maximum delay time fluctuation of the communication network. At present, since there is no standard of tolerance level of delay time fluctuation in communication network, it is not clear how much the maximum delay time fluctuation is, that is, it is not clear how much audio data should be stored in the receiving buffer 1103. The capacity of the receiving buffer 1103 (the maximum capacity of storing the audio data) has been determined uniformly on the basis of the assumption of the maximum delay time fluctuation of the communication network.

FIG. 12 is a block diagram showing a conventional audio transmission apparatus, in which an audio packet is received by using an asynchronous communication network such as Ethernet. In FIG. 12, a real-time audio transmission apparatus 1201 comprises a network-interface (communication network I/F unit) 1202, a receiving buffer 1203, an audio decoder 1204, a D/A converter 1206, a buffer controller 1208, an asynchronous communication network 1211 such as Ethernet, and an audio reproduction switch 1213.

In thus composed audio transmission apparatus, an outline of operation is described below. The buffer controller 1208, initially, turns off the audio reproduction switch 1213 until a specific amount of audio data is stored in the receiving buffer 1203, and does not reproduce the sound. When storage of specific amount of audio data in the receiving buffer 1203 is detected, the buffer controller 1208 turns on the audio reproduction switch 1213. Then, the audio decoder 1204 and D/A converter 1206 start their operation, and sound reproduction begins. As far as the delay time fluctuation in the communication network 1211 is within the reproduction time of the audio data stored in the receiving buffer 1203, the continuous reproduction is possible by reproducing the stored audio data until the next audio packet gets into the receiving buffer 1203.

In this countermeasure, the capacity of the receiving buffer (the maximum capacity of storing audio data) has been fixed uniformly on the assumption of the maximum delay time fluctuation of the communication network. This is, however, merely a prediction. If a delay time fluctuation more than a reproducing time of stored audio data actually occurs, the stored audio data becomes empty until next audio packet is received, and audio data under-run occurs and then a lack of reproduced sound happens, and the reproduced audio quality deteriorates.

An amount of audio data stored in the receiving buffer itself may cause more audio delay time. Therefore, it should be avoided to store too much data, so as to keep the delay time low. Accordingly, the storing amount of audio data has been determined by actually investigating the communication network or by a method depending on experiences. If the storage amount is thus determined, in the case of worsening of operation condition of communication network, audio quality deterioration occurs. Therefore in order to maintain audio reproduction of high quality, the quality of communication network must be maintained higher than a specific level, but it means higher cost and it is difficult to realize.

If the delay time fluctuation of communication network is constant, in the case of failure in achieving clock synchronism between communication devices, the audio data may becomes empty or overflow in the receiving buffer when the reception state lasts for a long time, and the sound may lack audio quality.

Between devices for real-time audio data communication, in order to synchronize in clock, it is general that both sides clock synchronize with the communication network. However, in the case of asynchronous communication network not having clock synchronizing means in the communication network itself such as Ethernet, a portion of audio data denoting sound is detected, and only this portion is sent out in packet, and the timing is adjusted at the receiving side in duration of audio data stream denoting no sound, so that the real-time reproduction is maintained.

Referring now to FIG. 13, the problem occurring due to a difference between the transmitting clock frequency and receiving clock frequency in the case of communication through an asynchronous communication network is explained. FIG. 13 shows a transition state of buffer storage amount in the receiving audio transmission apparatus 1201 when the transmission coding clock frequency is larger than the receiving decoding clock frequency in the conventional audio transmission apparatus. Reference numerals 1310 and 1312 at the upper side of the diagram show data blocks in time duration when writing the audio data received in the network-interface 1202 in FIG. 12 into the receiving buffer 1203, 1311 and 1313 show data blocks of time duration when reading out audio data from the receiving buffer 1203 into the audio decoder 1204. First, the time duration 1301 and 1305 in the diagram represent the time from the start of reception of audio data from the communication network 1211 in a state not having data to be read out from the receiving buffer to the time when reading is started from the receiving buffer 1203 as the buffer amount exceeds a certain threshold (START) 1308.

Time duration 1302 is the time duration of simultaneous writing and reading of the receiving buffer 1203, in which the transmitting coding clock frequency is higher than the receiving side decoding clock frequency, and therefore the storage amount of the receiving buffer is slightly increased along with the lapse of time. During the time duration 1303, only the reading is made and the writing is terminated. In the time duration 1304, the receiving buffer is empty, and no sound is reproduced.

As shown in FIG. 13, if the data block is long as in the case of reception data 1312, while writing and reading are done simultaneously in the receiving buffer 1203 in time duration 1306, the storage amount exceeds FULL 1309 in time duration 1307. Then, the receiving buffer overflows in the portion of reception data 1314. Thus, if the transmitting coding clock frequency is even slightly higher than the receiving decoding clock frequency, as shown in FIG. 13, the storage amount of the receiving buffer slightly increases along with the lapse of time, and the receiving buffer overflows. This overflow duration corresponds to the time duration 1307 in the diagram, and the audio data 1315 is lacking in this period, and the audio quality deteriorates.

SUMMARY OF THE INVENTION

It is hence an object of the invention to present an audio transmission apparatus capable of reproducing the audio continuously, by avoiding troubles such as empty audio data to be reproduced or lacking of audio due to overflow of receiving buffer, regardless of the quality of the communication network To solve the problems, the real-time audio transmission apparatus of the invention comprises a receiving buffer for storing the data block received from the communication network temporarily, and a buffer storage amount controller for monitoring the data amount stored in the receiving buffer, in which the readout speed of reading audio data from the receiving buffer is varied depending on the monitoring result of the buffer storage amount controller. Therefore, the storage amount of the receiving buffer is controlled appropriately, and the audio data in the receiving buffer is prevented from being empty or overflowing, so that audio data can be transmitted continuously in real time.

The audio transmission apparatus of the invention also includes a delay time fluctuation measuring section for measuring the delay time fluctuation which is a variation width of irregular delay time from the receiving time duration of audio packet being received. On the basis of the delay time fluctuation measured in the delay time fluctuation measuring section, the storage amount of data in the receiving buffer is controlled. Therefore, if the delay time of the communication network varies, overflowing of receiving buffer and lacking of audio data due to empty receiving buffer during audio data transfer can be avoided, and the audio data can be transmitted continuously in real time.

DETAILED DESCRIPTION OF THE EMBODIMENTS

Referring now to FIG. 1 to FIG. 9, preferred embodiments of the invention are described below.

Embodiment 1

Figure 1:
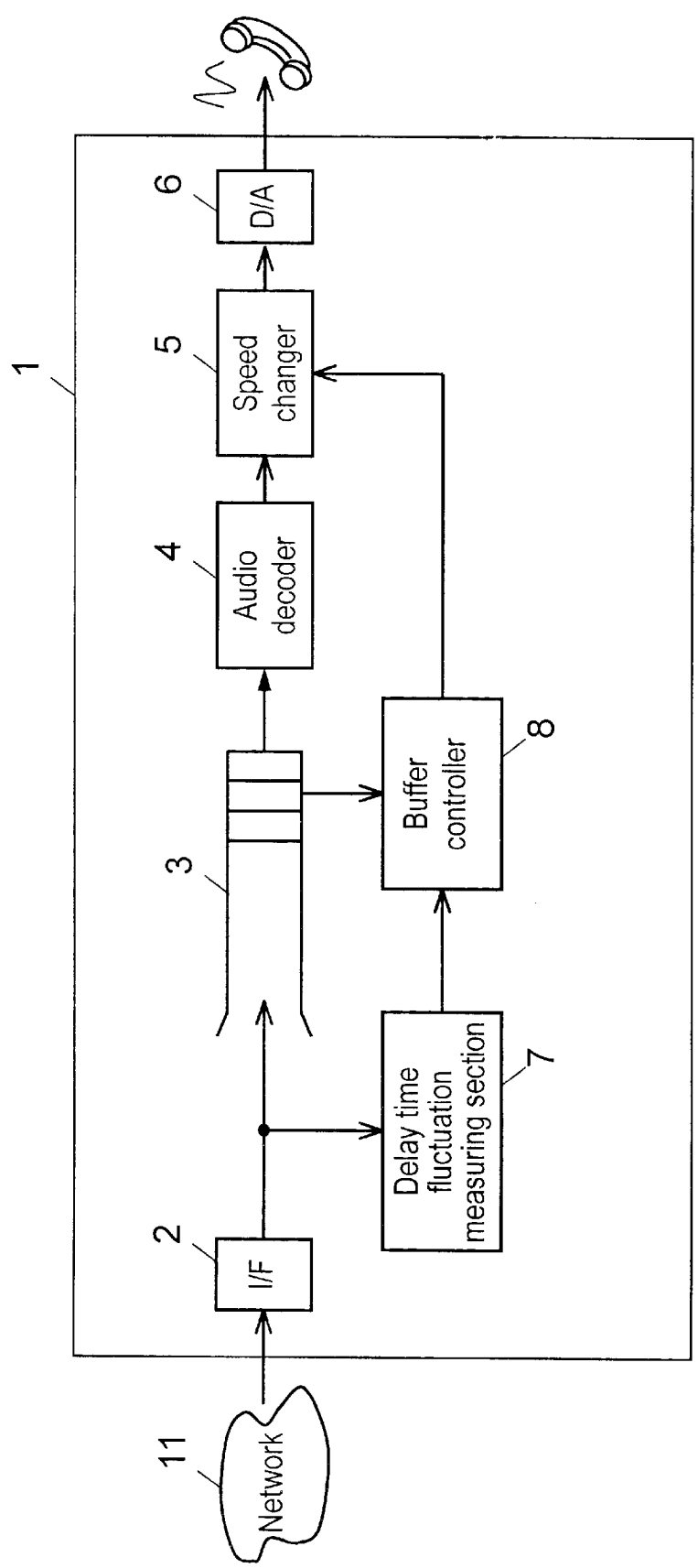
FIG. 1 is a block diagram showing an audio transmission apparatus according to embodiment 1 of the invention.

FIG. 1 is a block diagram showing an audio transmission apparatus according to embodiment 1 of the invention.

An audio transmission apparatus 1 is connected to a communication network 11 for asynchronous transmission such as Ethernet, and transmits and receives audio data in real time. A network interface section (network I/F section) 2 is responsible for an interface with the communication network 11. A receiving buffer 3 is for storing audio packet temporarily. An audio decoder 4 decodes the audio data stored in the receiving buffer 3. A D/A converting speed changer 5 is disposed between the audio decoder 4 and a D/A converter 6 described below, and changes the D/A converting speed in appearance. The D/A converter 6 converts digital audio data into the analog signal. A time delay fluctuation measuring section 7 measures the delay time fluctuation which is a variation width of delay time from the receiving time duration of the audio packet received from the communication network 11. A buffer controller 8 controls the data storage amount of the receiving buffer 3, on the basis of the delay time fluctuation measured in the delay time fluctuation measuring section 7.

In thus constructed audio transmission apparatus 1, the operation is described below.

First, the delay time fluctuation is explained. Delay of data in the communication network for asynchronous transmission may vary irregularly. This delay time fluctuation is a time width of such variation.

Of the audio packets received from the communication network 11, the time required from receiving of one packet to receiving of next packet (packet receiving time duration TR) is measured in the delay time fluctuation measuring section 7. If the delay time is constant in the communication network, the packet is received in the same duration as the packet transmission time duration. However, in the case of asynchronous communication network such as Ethernet, since the delay time is unstable, the receiving time duration varies. This variation is due to delay time fluctuation, and the delay time fluctuation TS is determined in formula (1).

Delay time fluctuation TS=packet receiving time duration TR−packet transmitting time duration TT. (1)

Generally, the packet transmitting time duration TT is regarded almost constant regardless of the state of the communication network 11, and it is supposed to be a fixed value. Accordingly, the delay time fluctuation TS is determined in the delay time fluctuation measuring section 7.

The measured delay time fluctuation TS is sent to the buffer controller 8, and the storage amount of audio data is determined so as to reproduce stably only by the audio data accumulated in the receiving buffer 3 for the portion of the delay time fluctuation.

Similarly, the buffer controller 8 requests a change of D/A converting speed to the D/A converting speed changer 5, and thereby adjusts the audio data flow from the receiving buffer 3, and controls the storage amount of the receiving buffer 3 to the determined storage amount. As a result, the audio data corresponding to the delay time fluctuation of the communication network 11 can be stored in the receiving buffer 3, and continuous audio reproduction is enabled.

Thus, according to the embodiment, the buffer controller 8 determines the audio data storage capacity capable of withstanding the delay time fluctuation in the communication network 11, and controls the D/A converting speed changer 5 so as to store this capacity always in the receiving buffer 3, so that the audio data flow from the receiving buffer 3 is adjusted. Therefore, regardless of the quality of the communication network 11, a lack of audio due to empty audio data to be reproduced can be avoided, and audio can be reproduced continuously.

It is also controlled herein so that the audio data amount more than the delay time fluctuation may be always stored in the receiving buffer.

The audio data amount stored in the receiving buffer may be kept at an optimum amount depending on the delay time at the moment, and the audio can be reproduced continuously while minimizing the delay of reproduced audio.

The buffer controller is so called herein, but the buffer controller 8 may be also called a buffer storage amount controller, as explained above, because it is designed to request change of D/A converting speed to the D/A converting speed changer 5 depending on the delay time fluctuation measured by the delay time fluctuation measuring section 7, adjust the audio data flow from the receiving buffer 3, and control the storage amount of the receiving buffer 3 to the determined storage amount.

Embodiment 2

Figure 2:
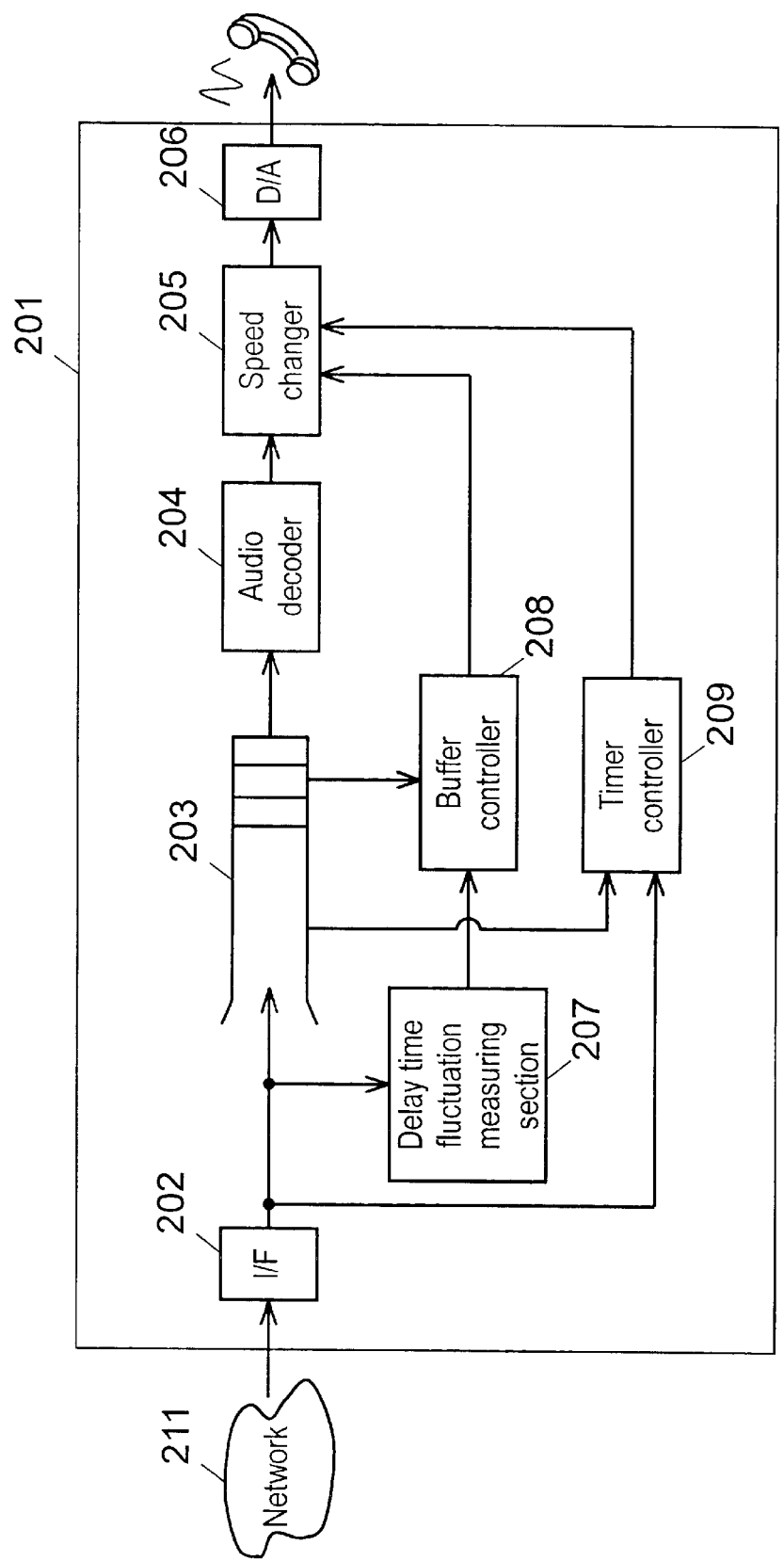
FIG. 2 is a block diagram showing an audio transmission apparatus according to embodiment 2 of the invention.

FIG. 2 is a block diagram showing an audio transmission apparatus according to embodiment 2 of the invention.

In FIG. 2, an audio transmission apparatus 201, a network interface section 202, a receiving buffer 203, an audio decoder 204, a D/A converting speed changer 205, a D/A converter 206, a delay time fluctuation measuring section 207, and a buffer controller 208 correspond to the audio transmission apparatus 1, network interface section 2, receiving buffer 3, audio decoder 4, D/A converting speed changer 5, D/A converter 6, delay time fluctuation measuring section 7, and buffer controller 8 in FIG. 1, respectively. Therefore, their explanations are omitted. In addition, a timer controller 209 is provided for reaching the time limit before the audio data stored in the receiving buffer 203 becomes empty.

In thus constructed audio transmission apparatus, the operation is explained below.

Every time an audio packet is received from a communication network 211, the timer in the timer controller 209 is reset and starts counting at the same time. Simultaneously, the timer controller 209 determines the reproduction time in the audio data stored in the receiving buffer 203 from the audio data storage amount at the present in the receiving buffer 203, and sets the time limit to reach within this reproduction time. If a next packet is received before the time limit, the same process is repeated. When reaching the time limit, the timer controller 209 recognizes the possibility of empty audio data, and requests slow-down of the D/A converting speed to the D/A converting speed changer 205, thereby suppressing data flow from the receiving buffer 203, and therefore the audio data is preventing from being empty and continuous audio reproduction is realized.

Thus, the embodiment includes the timer controller 209 for reaching the time limit before the audio data stored in the receiving buffer 203 becomes empty. If packet is not received for a specific time, the timer controller 209 recognizes the possibility of emptiness of audio data stored in the receiving buffer 203 as reaching the time limit. At this time, the timer controller 209 controls the D/A converting speed changer 205 to slow down the D/A converting speed in the D/A converter 206, so that data flow from the receiving buffer 203 can be suppressed. Therefore, an occurrence of lack of audio data due to emptiness of audio data can be avoided, and the continuous audio reproduction is assured.

Embodiment 3

Figure 3:
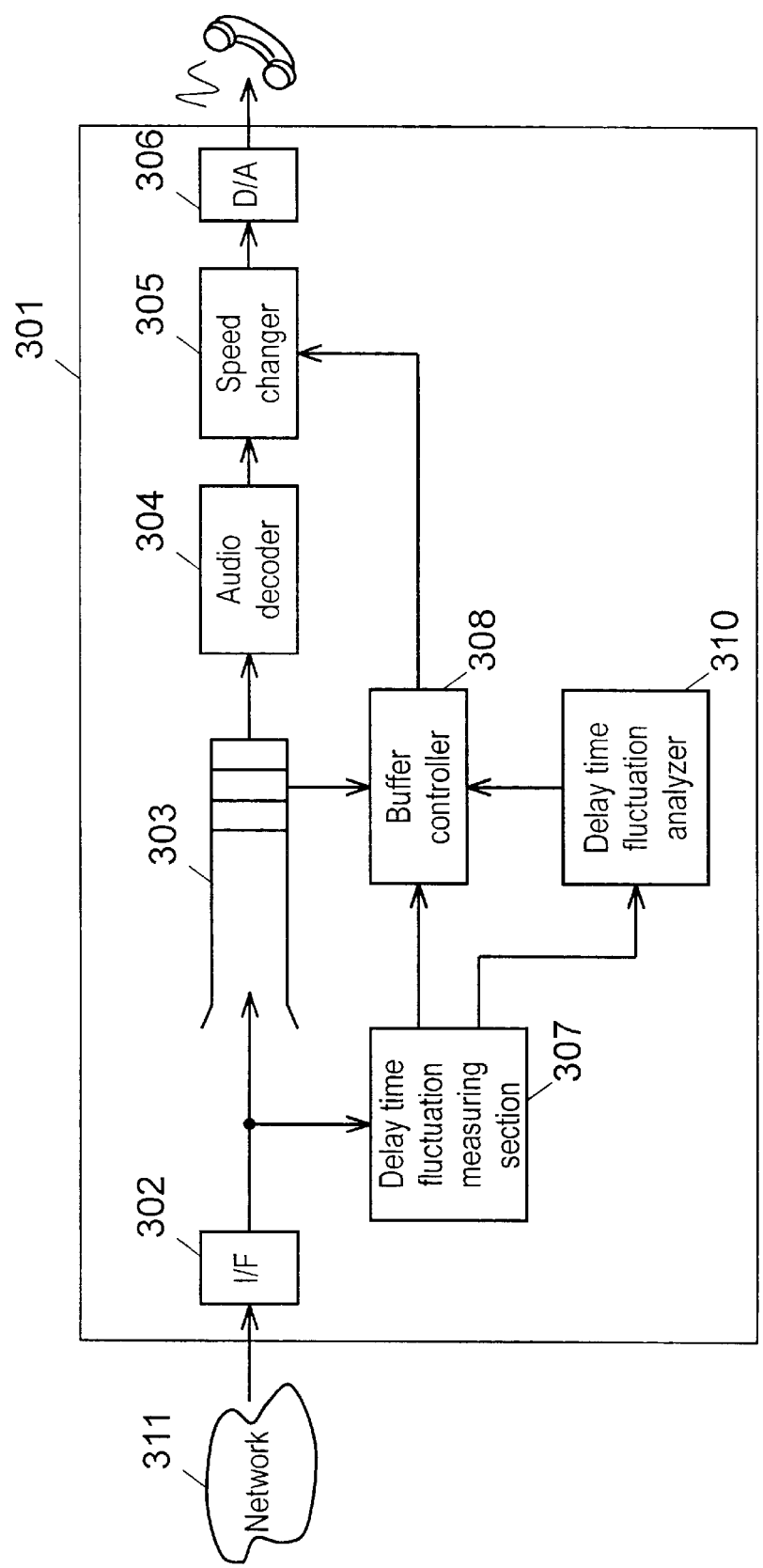
FIG. 3 is a block diagram showing an audio transmission apparatus according to embodiment 3 of the invention.

FIG. 3 is a block diagram showing an audio transmission apparatus according to embodiment 3 of the invention.

In FIG. 3, an audio transmission apparatus 301, a network interface section 302, a receiving buffer 303, an audio decoder 304, a D/A converting speed changer 305, a D/A converter 306, a delay time fluctuation measuring section 307, and a buffer controller 308 correspond to the audio transmission apparatus 1, network interface section 2, receiving buffer 3, audio decoder 4, D/A converting speed changer 5, D/A converter 6, delay time fluctuation measuring section 7, and buffer controller 8 in FIG. 1, respectively. Therefore, their explanations are omitted. In FIG. 3, a delay time fluctuation analyzer 310 is added to the structure of FIG. 1. The delay time fluctuation analyzer 310 analyzes the condition of delay time fluctuation on the basis of the delay time fluctuation data obtained from the delay time fluctuation measuring section 307.

In thus constructed audio transmission apparatus, the operation is described below.

In the audio packets received from a communication network 311, the time required from receiving of one packet to receiving of next packet (packet receiving time duration TR) is measured in the delay time fluctuation measuring section 307, and the delay time fluctuation TS is determined in formula (1). The calculated delay time fluctuation TS is monitored in the delay time fluctuation analyzer 310. The delay time fluctuation analyzer 310 judges that the communication network 311 is stabilized when the calculated delay time fluctuation TS maintains a specific range for a specific time, and requests the buffer controller 308 to decrease the buffer data storage amount. As a result, the buffer controller 308 requests the D/A converting speed changer 305 to increase the D/A converting speed to promote data flow of the receiving buffer 303. Then, the data storage amount in the receiving buffer 303 can be decreased gradually. Thus, the audio delay time is made lower.

As described herein, the embodiment includes the delay time fluctuation analyzer 310 for analyzing the condition of delay time fluctuation. When the delay time fluctuation analyzer 310 judges that the calculated delay time fluctuation TS maintains a specific range for a specific time, the buffer controller 308 controls the D/A converting speed changer 305, and accelerates the D/A converting speed in the D/A converter 306. Thus, data flow of the receiving buffer 303 is promoted, and the data storage amount in the receiving buffer 303 can be decreased gradually, so that the audio delay time is made lower.

Embodiment 4

Embodiment 4 of the invention is explained below while referring to FIG. 4 and FIG. 5. In a block diagram showing an audio transmission apparatus according to the embodiment in FIG. 4, an asynchronous communication network 411 such as Ethernet or ATM, and an audio transmission apparatus 451 are shown.

The audio transmission apparatus 451 is composed as follows.

A network interface section 452 acts as an interface with the asynchronous communication network 411. A receiving buffer 453 temporarily stores audio data received through the network interface section 452. A buffer storage amount controller 454 monitors the storage amount of the receiving buffer 453. Curtailing/interpolating means 455 curtails or interpolates the audio data being read out from the receiving buffer 453 depending on the result of monitoring by the buffer storage amount controller 454. An audio decoder 456 decodes the audio data through the curtailing/interpolating means 455, and reproduces an analog audio signal. An audio encoder 457 encodes an analog audio input signal from a microphone or the like into digital audio data. A clock generator 458 generates a basic clock for giving encoding or decoding rate to the audio decoder 456 and audio encoder 457.

The operation is described below while referring to a transition state chart of buffer data storage amount of the audio transmission apparatus according to the embodiment in FIG. 5. The upper side of FIG. 5 denotes an audio data block 506 received from the asynchronous communication network 411, and a audio data block 507 being read out from the receiving buffer 453. The lower side of the drawing shows changes of storage amount in the receiving buffer 453. Time duration 501 is the time from the start of receiving audio data from the network in an absent state of data to be read from the receiving buffer 453, to the start of reading from the receiving buffer as the buffer amount exceeds a certain threshold (START) 508. When the buffer amount exceeds the threshold (START) 508, reading is started. Time duration 502 denotes a time duration of simultaneous writing and reading in the receiving buffer. In this example, the transmitting coding clock frequency is higher than the receiving decoding clock frequency, and the storage amount of the receiving buffer is slightly increased along with the lapse of time.

In certain duration 502 after start time (t1) of audio reproduction, the storage amount of the receiving buffer reaches a preset threshold (SH1) 510, and it is detected by the buffer storage amount controller 454, and is noticed to the curtailing/interpolating means 455. Receiving this notice, the curtailing/interpolating means 455 starts to curtail the audio data being read out from the receiving buffer 453 so as not to exceed the threshold 510.

Starting to curtail the audio data, the storage amount of the receiving buffer 453 decreases gradually. In time duration 503, as the audio data is being curtailed, the storage amount of the receiving buffer is decreased.

When the storage amount of the receiving buffer reaches the threshold (SH2) 511, it is detected by the buffer storage amount controller 454, and noticed to the curtailing/interpolating means 455. Receiving this notice, the curtailing/interpolating means 455 starts to interpolate audio data to the audio data being read out from the receiving buffer so as not to be lower than the threshold 511. During time duration 504, the interpolation of audio data makes the storage amount of the receiving buffer increase gradually. When reaching the threshold 510 again, the curtailing/interpolating means 455 begins to interpolate the audio data. While receiving the audio data, the explained curtailing and interpolating actions are repeated (time duration 505).

Such constitution avoids occurrence of lack of audio data due to overflow of the receiving buffer or emptiness of receiving buffer during audio data transfer. Therefore, even by using the communication network of asynchronous transmission, it is not necessary to synchronize in clock between terminal devices, and continuous audio data can be transmitted at high quality.

That is, by varying the data curtailing or interpolating amount, the audio data amount stored in the receiving buffer may be an optimum amount. Therefore, it evades troubles of occurrence of lack of audio data due to overflow of the receiving buffer or emptiness of receiving buffer during audio data transfer. Thus, audio data can be transmitted continuously and in real time.

Embodiment 5

Figure 4:
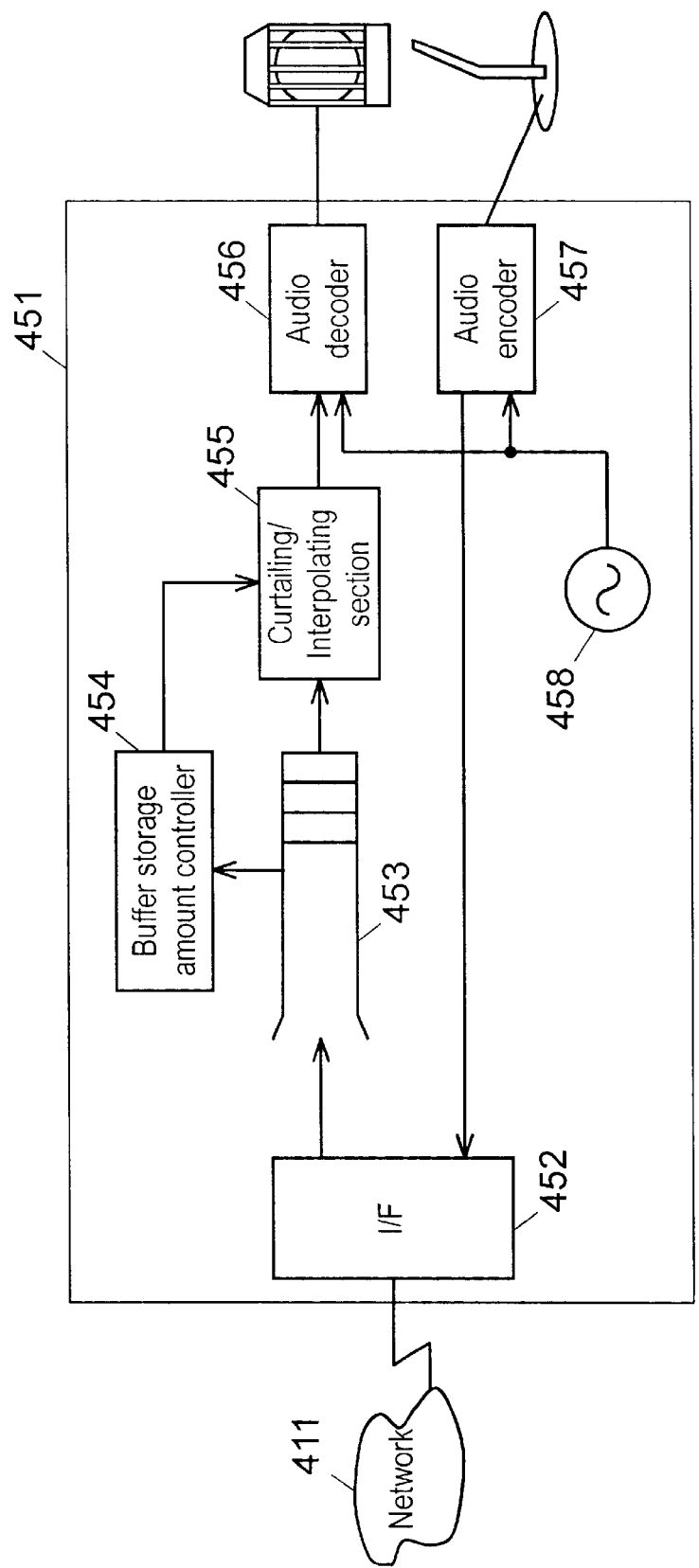
FIG. 4 is a block diagram showing an audio transmission apparatus according to embodiment 4 of the invention.
Figure 5:
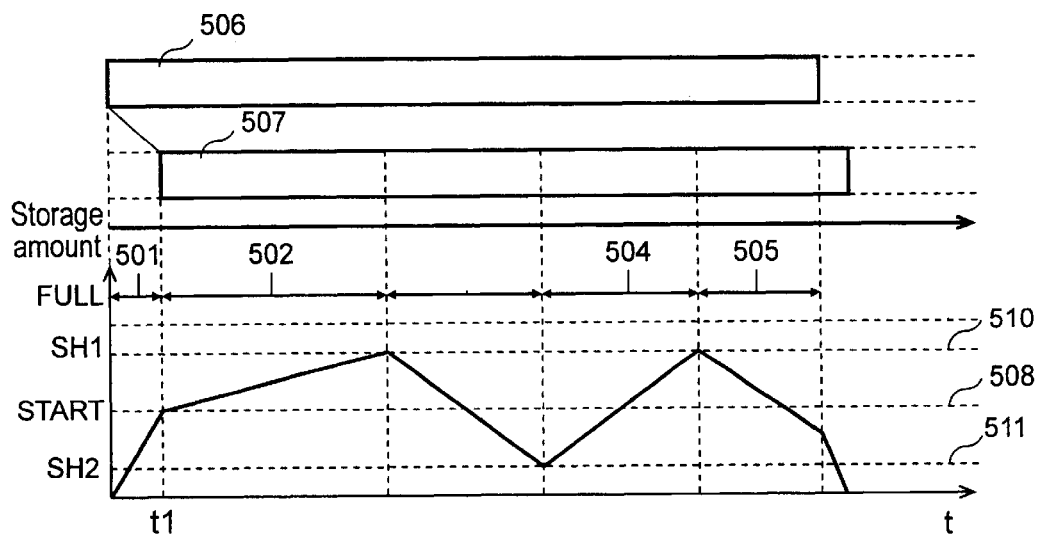
FIG. 5 is a transition state chart of buffer storage amount of the audio transmission apparatus according to embodiment 4.
Figure 6:
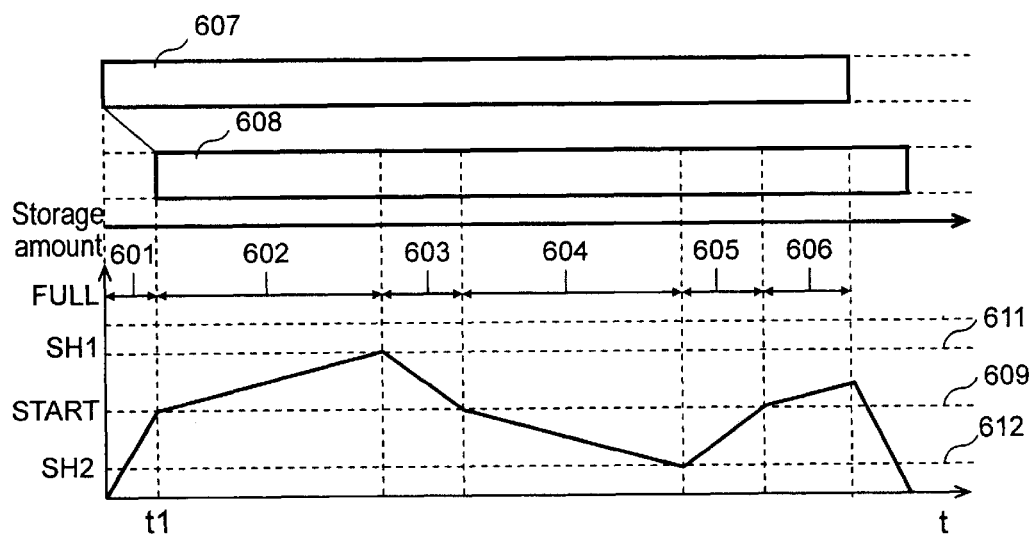
FIG. 6 is a transition state chart of buffer storage amount of an audio transmission apparatus according to embodiment 5 of the invention.

Similar to the audio transmission apparatus 451 in FIG. 4, this embodiment differs in the buffer storage amount monitoring system, and is explained in a transition state chart of buffer storage amount of audio transmission apparatus 451 in FIG. 6. In the operation explained in FIG. 5, once getting into curtailing or interpolating action, the action is not changed to a normal operation neither curtailing nor interpolating, but in the embodiment shown in FIG. 6, even after getting into curtailing or interpolating action, the action returns to a normal operation neither curtailing nor interpolating when the buffer storage amount reaches the threshold (START) 609 again.

In the upper side of FIG. 6, reference numeral 607 denotes an audio data block received from the asynchronous communication network 411, and 608 shows an audio data block being readout from the receiving buffer 453. The lower side of the drawing shows changes of storage amount of the receiving buffer 453. Time duration 601 shows the time from the start of receiving of audio data from the network in an absent state of data to be read out from the receiving buffer, to the start of reading from the receiving buffer as the buffer storage amount exceeds a certain threshold (START) 609. Time duration 602 is time duration of simultaneous writing and reading in the receiving buffer 453. In this example, the transmitting coding clock frequency is higher than the receiving decoding clock frequency, and the storage amount of the receiving buffer increases slightly along with the lapse of time.

In certain duration 602 after the start time (t1) of audio reproduction, the storage amount of the receiving buffer 453 reaches a preset threshold (SH1) 611, and it is detected by the buffer storage amount controller 454, and is noticed to the curtailing/interpolating means 455.

Receiving this notice, the curtailing/interpolating means 455 starts to curtail the audio data being read out from the receiving buffer so as not to exceed the threshold 611. In time duration 603 by curtailing the audio data, the storage amount of the receiving buffer decreases gradually. When the storage amount of the receiving buffer reaches the threshold (START) 609, it is detected by the buffer storage amount controller 454, and noticed to the curtailing/ interpolating means 455. Receiving this notice, the curtailing/interpolating means 455 returns to a normal operation without curtailing the audio data being read out from the receiving buffer.

In time duration 604, the transmitting coding clock frequency is lower than the receiving decoding clock frequency, and the storage amount of the receiving buffer decreases slightly along with the lapse of time. In certain duration 604 after the start time of audio reproduction by normal operation, the storage amount of the receiving buffer reaches a preset threshold (SH2) 612, and it is detected by the buffer storage amount controller 454, and is noticed to the curtailing/interpolating means 455. Receiving this notice, the curtailing/interpolating means 455 starts to interpolate audio data to the audio data being read out from the receiving buffer so as not to lower than the threshold 612. In time duration 605 by interpolating the audio data, the storage amount of the receiving buffer 453 increases gradually to reach the threshold (START) 609, and it is detected by the buffer storage amount controller 454, and noticed to the curtailing/interpolating means 455. Receiving this notice, the curtailing/interpolating means 455 returns to a normal operation without curtailing the audio data being read out from the receiving buffer. At this time, the transmitting coding clock frequency is higher than the receiving decoding clock frequency. While receiving the audio data, the curtailing and interpolating action and normal operation explained above are repeated (time duration 606).

In this way, the threshold of buffer amount for transition from the normal mode of neither curtailing nor interpolating to curtailing mode, the threshold of buffer amount for a transition from the curtailing mode to the normal mode, the threshold of buffer amount for a transition from the normal mode to the interpolating mode, and the threshold for a transition from the interpolating mode to the normal mode are defined. These threshold values are monitored in the buffer storage amount controller. Therefore the duration of normal operation can be extended, and audio quality is maintained, and the audio transmission of higher quality is realized.

Embodiment 6

A different embodiment capable of recognizing lack of audio data in the block diagram in FIG. 4 is explained below while referring to FIG. 7, FIG. 8 and FIG. 9.

Figure 7:
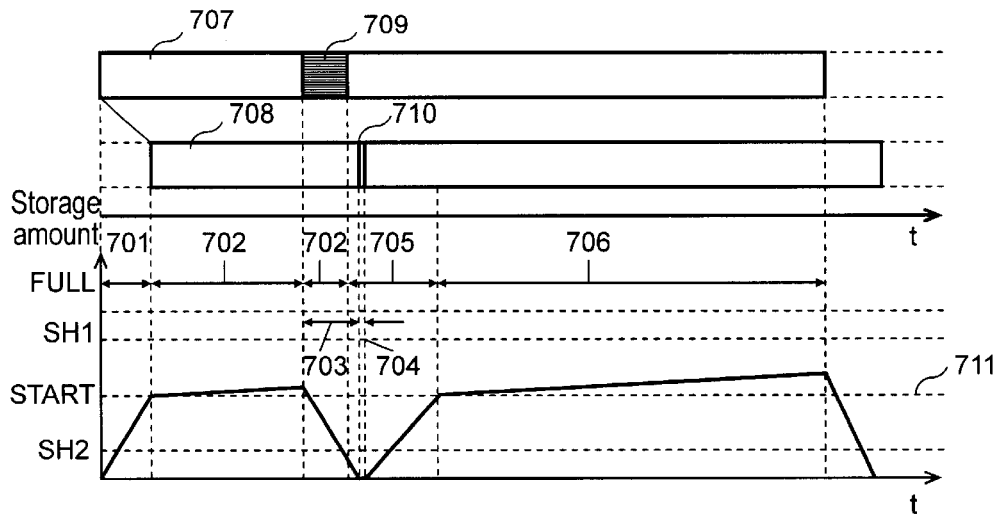
FIG. 7 is a transition state chart of buffer storage amount in the event of lacking of audio data in asynchronous communication network.

FIG. 7 is a transition state chart of buffer storage amount in the case of lack of audio data in an asynchronous communication network. In FIG. 7, reference numeral 707 at the upper side shows an audio data block received from the asynchronous communication network 411, and 708 is an audio data block being read out from the receiving buffer 453. The lower side of the drawing shows changes of storage amount of the receiving buffer 453. Time duration 701 shows the time from the start of receiving of audio data from the network in an absent state of data to be read out from the receiving buffer 453, to the start of reading from the receiving buffer as the buffer storage amount exceeds a certain threshold (START) 711. When the buffer storage amount exceeds the threshold (START) 711, reading is started. Time duration 702 is time duration of simultaneous writing and reading in the receiving buffer. In this example, the transmitting coding clock frequency is higher than the receiving decoding clock frequency, and the storage amount of the receiving buffer increases slightly along with the lapse of time.

In time duration 702 after the start of audio reproduction, lack 709 of audio data block occurs, and the storage amount of the receiving buffer 453 drops, and after the time duration 703, lack of audio occurs in time duration 704.

Figure 8:
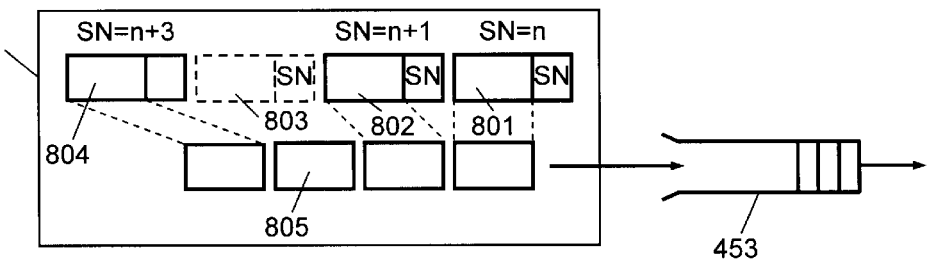
FIG. 8 is an operation explanatory diagram of receiving section of network interface of an audio transmission apparatus according to embodiment 6 of the invention.

Referring now to FIG. 8, the operation of the receiving section of the network interface of the audio transmission apparatus in embodiment 6 is explained below. At the transmitting side, the audio data to be transmitted is divided into fixed length blocks in advance, and each block is assigned with sequence number (SN) as shown in 801 to 804 in FIG. 8.

At the receiving side, the audio data assigned with sequence number as shown in FIG. 8 is received in the network interface 452 in FIG. 4, and lack of audio data block is monitored by the sequence number. If lack of audio data occurs on the asynchronous communication network 411, no-sound data 805 is inserted and written into the receiving buffer 453 for the lacking portion of the audio data block 803 judged from the sequence number as shown in FIG. 8. In the example in FIG. 8, lack of audio data block of sequence number n+2 is detected when sequence number n+3 is received.

Thus, at the transmitting side of the network interface section, the audio data is divided into fixed length blocks, and sent out together with the sequence numbers, and lack of audio data on the communication network for asynchronous transmission is recognized in the receiving side audio transmission apparatus.

Figure 9:
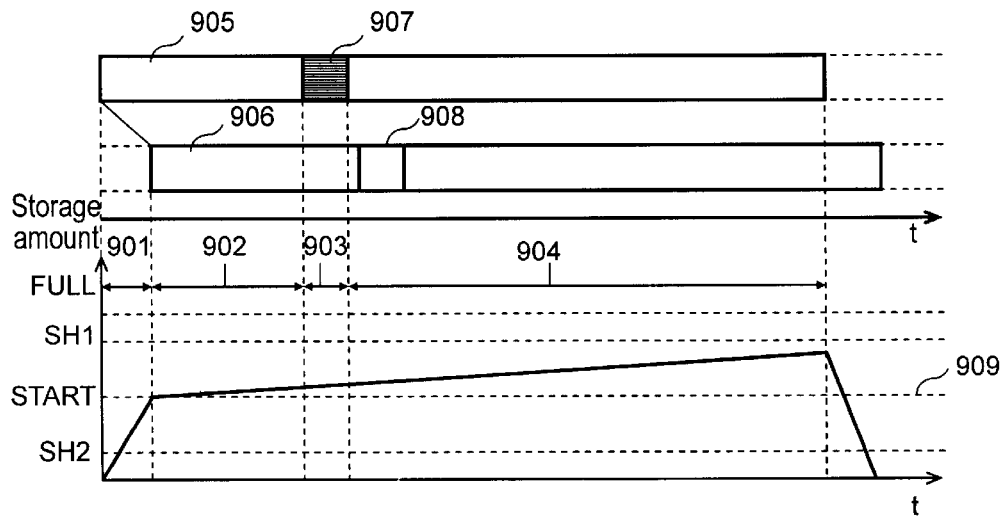
FIG. 9 is a transition state chart of buffer storage amount of the audio transmission apparatus according to embodiment 6.
Figure 10:
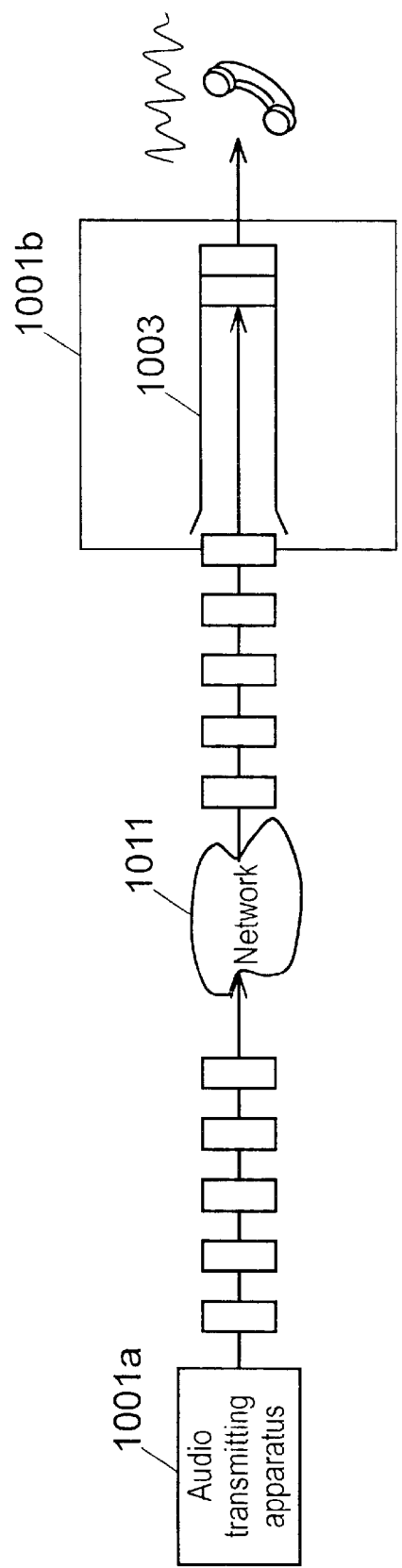
FIG. 10 is an explanatory diagram showing a first example of communication system using a conventional audio transmission apparatus.
Figure 11:
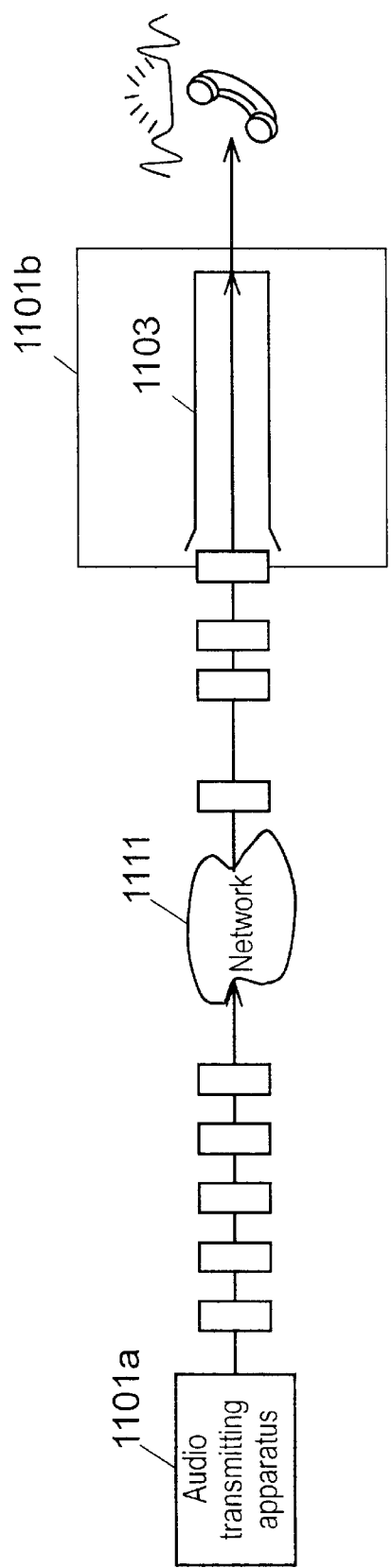
FIG. 11 is an explanatory diagram showing a second example of communication system using a conventional audio transmission apparatus.
Figure 12:
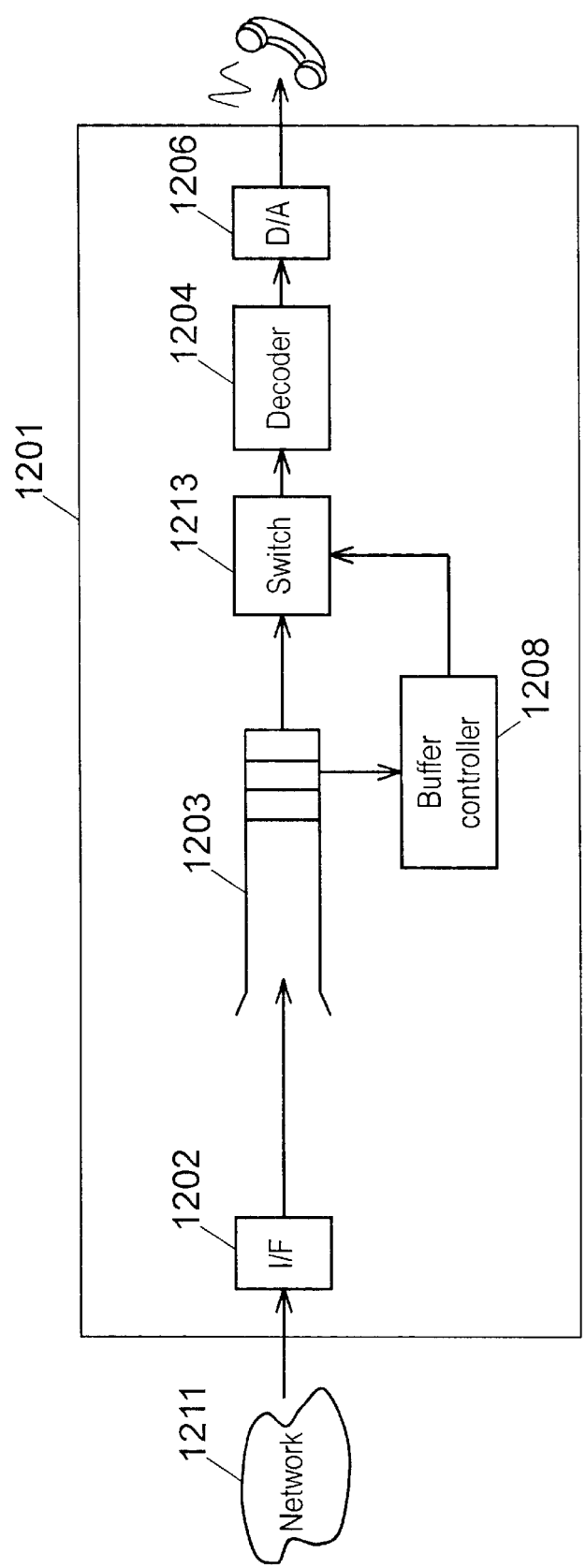
FIG. 12 is a block diagram showing a conventional audio transmission apparatus.
Figure 13:
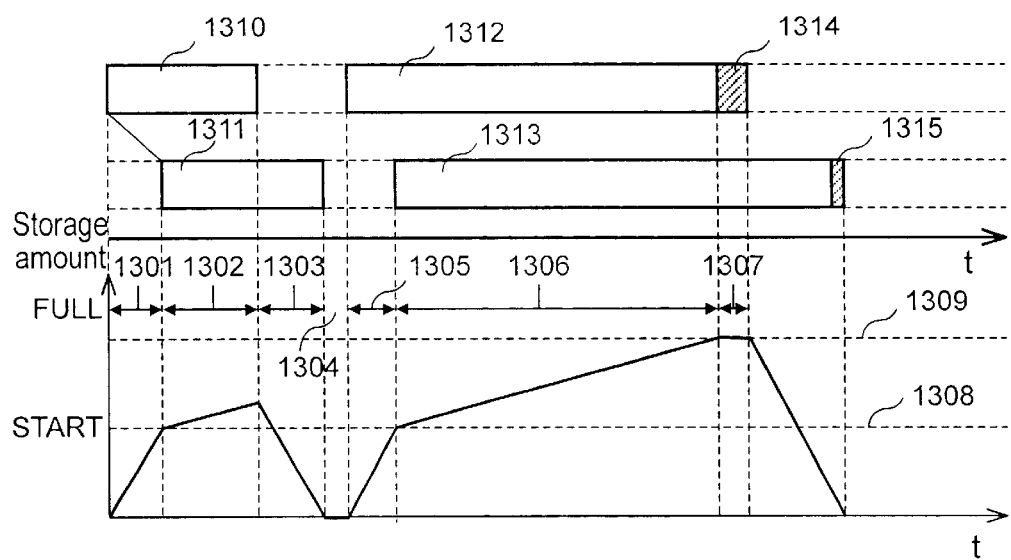
FIG. 13 is a transition state chart of buffer storage amount of a conventional audio transmission apparatus.

FIG. 9 shows a transition state chart of buffer storage amount in the event of lacked block of audio data in the asynchronous communication network. In the upper side of FIG. 9, reference numeral 905 denotes an audio data block received from the asynchronous communication network 411, and 906 shows an audio data block being read out from the receiving buffer 453. The lower side of the diagram shows changes of storage amount of the receiving buffer 453. Time duration 901 shows the time from the start of receiving of audio data from the network in an absent state of data to be read out from the receiving buffer 453, to the start of reading from the receiving buffer as the buffer storage amount exceeds a certain threshold (START) 909. When the buffer storage amount exceeds the threshold (START) 909, reading is started. Time duration 902 is time duration of simultaneous writing and reading in the receiving buffer. In this example, the transmitting coding clock frequency is higher than the receiving decoding clock frequency, and the storage amount of the receiving buffer increases slightly along with the lapse of time.

In time duration 902 after the start of audio reproduction, when lack 907 of audio data block is judged, the receiving side audio transmission apparatus inserts no-sound audio data block 908 to compensate for the lack, and therefore sudden change in storage amount does not occur in time duration 903 and 904. By thus inserting no-sound audio data block, the retention time of audio data in the receiving buffer is kept constant. That is, preventing sudden change in the storage amount in the receiving buffer, it is possible to reproduce audio continuously in time, and if lack of audio data occurs on the communication network, audio data continuous in time can be transmitted at high quality.

That is, occurrence of lack of data block on the network can be recognized at the receiving side, and in the event of lack of data block on the network, the lacked audio block is not reproduced discontinuously in time, so that the audio quality may be maintained.

In the foregoing embodiments 4, 5, 6, the readout speed from the buffer is changed in steps, but this change may be varied more finely depending on the degree of increase of storage into the buffer or degree of change of buffer storage amount. The threshold values for changing the read-out speed or changing over curtailing and interpolating actions are not limited to three points of (START), (SH1), (SH2), but may be increased in the number of points so as to change more finely depending on the threshold.

As described herein, the audio transmission apparatus of the invention comprises a receiving buffer for storing data blocks received from a communication network temporarily, and a buffer storage amount controller for monitoring the data amount stored in this receiving buffer, and is designed to change the read-out speed when reading out the audio data from the receiving buffer depending on the result of monitoring by this buffer storage amount controller. In this configuration, if the delay time of the communication network is not stable, or if the clocks are not synchronized between transmitting and receiving devices, data of appropriate amount can be stored in the receiving buffer.

The audio transmission apparatus of the invention also includes a delay time fluctuation measuring section for measuring the delay time fluctuation which is a variation width of irregular delay time from the receiving time duration of the audio packet being received. On the basis of the delay time fluctuation measured in the delay time fluctuation measuring section, the data storage amount of the receiving buffer is controlled. In this structure, if the delay time of the communication network varies, it is possible to avoid troubles such as overflow of receiving buffer, or lack of audio data due to emptiness of receiving buffer during audio data transfer, so that the audio data can be transmitted continuously and in real time.

What is claimed is:

1. An audio transmission apparatus connected to a communication network for an asynchronous transmission for making a real-time transmission and reception of audio data, comprising:

a network interface section acting as an interface with said communication network;

a delay time fluctuation measuring section for measuring a delay time fluctuation which is a variation width of irregular delay time from receiving time duration of audio packet received from said communication network;

a receiving buffer for storing an audio packet received from said network interface section;

an audio decoder for decoding the data of said audio packet stored in said receiving buffer;

a D/A converter for converting digital audio data decoded in said audio decoder into an analog signal;

a D/A converting speed changer disposed between said audio decoder and said D/A converter for changing a D/A converting speed in said D/A converter;

a buffer controller for controlling a data storage amount of said receiving buffer on the basis of the delay time fluctuation measured in said delay time fluctuation measuring section, and a timer controller for reaching a time limit before the data stored in said receiving buffer becomes empty, wherein said buffer controller determines the data storage amount capable of withstanding the delay time fluctuation on the basis of the variation of the delay time fluctuation measured in said delay time fluctuation measuring section, and controls said D/A converting speed changer so as to store the audio data in an audio data storage capacity in said receiving buffer, and wherein said timer controller is reset every time the audio packet is input into the receiving buffer, said timer controller determines a reproduction time of the audio data stored in the receiving buffer from the audio data storage amount at present in the receiving buffer, and the time limit is set within the reproduction time, and wherein said timer controller, When recognizing the time limit, controls said D/A converting speed changer, and slows down the D/A converting speed in said D/A converter.

2. The audio transmission apparatus of claim 1, further comprising:

a delay time fluctuation analyzer for analyzing a condition of the delay time fluctuation, wherein said buffer controller,: when said delay time fluctuation analyzer judges that the delay time fluctuation is kept within a certain value for a certain time, controls said D/A converting time changer so as to increase the D/A converting speed in said D/A converter.

* * * * *